United States Patent [19]

Rainbolt et al.

[11] 4,002,226
[45] Jan. 11, 1977

[54] DISC BRAKE

[75] Inventors: Jack D. Rainbolt, Troy; Ronald R. Suerdieck, Tipp City, both of Ohio

[73] Assignee: The B.F. Goodrich Company, Akron, Ohio

[22] Filed: Dec. 15, 1975

[21] Appl. No.: 640,590

[52] U.S. Cl. .............................. 188/73.3
[51] Int. Cl.² ........................ F16D 55/224
[58] Field of Search ....... 188/73.1, 73.2, 73.3–73.6, 188/18 A

[56] References Cited

UNITED STATES PATENTS

| | | | |
|---|---|---|---|
| 3,363,727 | 1/1968 | Thirion | 188/73.4 |
| 3,433,328 | 3/1969 | Swift | 188/73.3 X |
| 3,536,166 | 10/1970 | Falk | 188/73.4 |
| 3,705,641 | 12/1972 | Brooks et al. | 188/73.3 |
| 3,710,896 | 1/1973 | Machek | 188/73.4 X |

*Primary Examiner*—Duane A. Reger
*Attorney, Agent, or Firm*—William A. Shira, Jr.; Frederick K. Lacher

[57] ABSTRACT

A disc brake of the floating caliper type in which the caliper extends axially over the edge of the brake disc and has radially extending members overlapping the opposite faces of the disc. A torque plate on one side of the disc has arms extending radially outward to positions on opposite sides of the caliper where a slider member is fastened to the arms. The slider member includes axially extending rails for sliding engagement with the caliper member and a tie bar connecting the rails. The tie bar is located radially inward of one of the radially extending members of the caliper to minimize the axial length of the brake assembly and damp the forces exerted on the rails by the lining carriers which are also slidably mounted on the rails.

10 Claims, 4 Drawing Figures

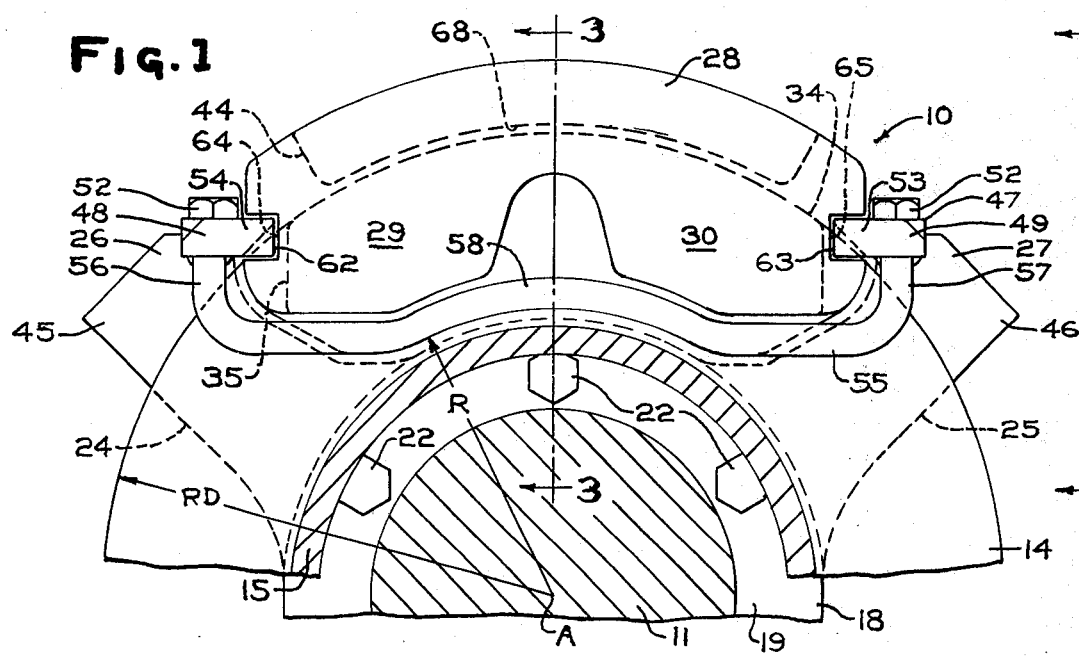
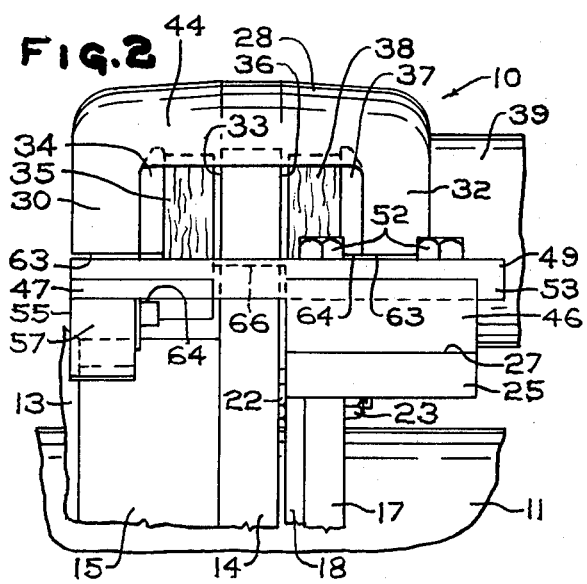
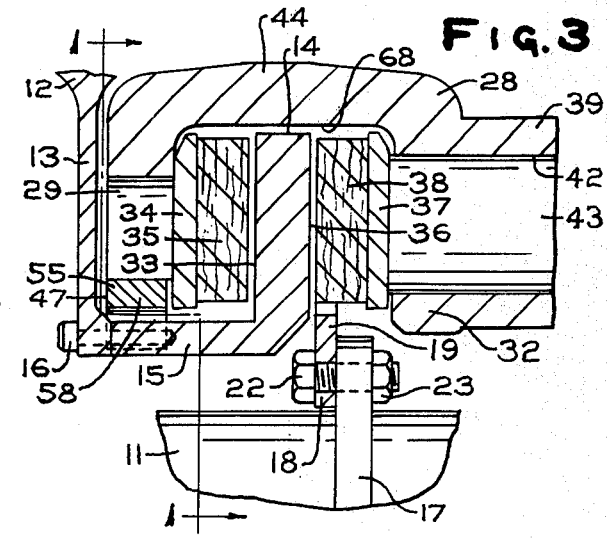
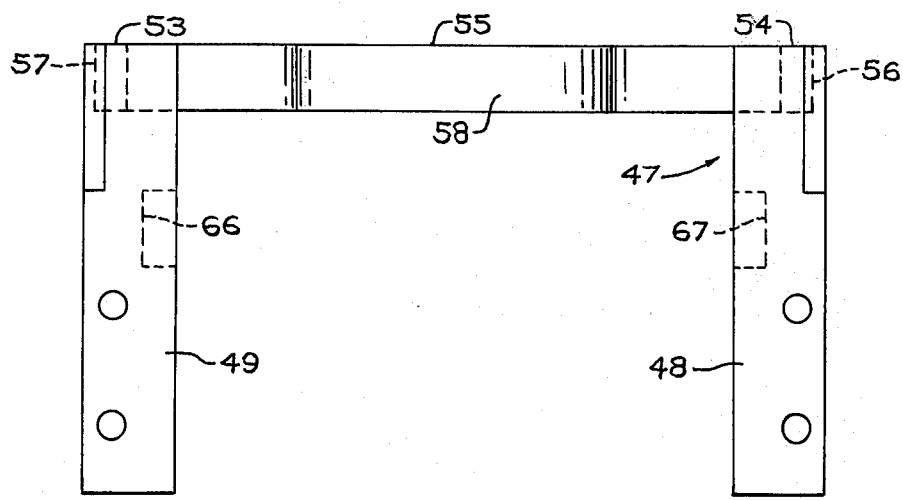

DISC BRAKE

BACKGROUND OF THE INVENTION

Heretofore disc brake assemblies have included a slider member having a pair of rails in sliding engagement with a floating caliper and the lining carriers. The rails have been connected by a connecting member in the same plane as the rails which extends around the end of the floating caliper and has required additional space in the wheel envelope beyond the outboard leg of the caliper. The caliper penetration into the wheel envelope has been limited accordingly and also the disc diameter has been limited for a given size wheel envelope.

SUMMARY OF THE INVENTION

The present invention provides a construction in which the need for additional space to accommodate a slider connecting member beyond the outboard leg of the caliper has been eliminated and maximum caliper penetration into the wheel envelope is obtained. The tie bar connecting the rails of the slider member is located in a position providing maximum clearance while at the same time providing a force damping affect to each rail. The maximum disc diameter for a given size wheel envelope is obtainable and the fabricated concept provides economies in manufacture and maintenance. Accordingly the tie bar is located in a position where it does not extend beyond the outboard leg of the caliper and the rails have a length which minimizes excessive overlap of the rails and the outboard caliper leg. This is accomplished by fastening the tie bar to the underside of the side rails and passing it between the outboard caliper leg and the disc adapter.

BRIEF DESCRIPTION OF THE DRAWINGS

FIG. 1 is a fragmentary elevation of a caliper disc brake taken along the planes of line 1—1 in FIG. 3 and showing the outboard leg of the caliper.

FIG. 2 is a side elevation view of the assembly shown in FIG. 1 taken along the plane of line 2—2 in FIG. 1 with parts being fragmented as in FIG. 1.

FIG. 3 is a fragmentary sectional view taken along the plane of line 3—3 in FIG. 1.

FIG. 4 is a plan view of the slider member showing the rails and tie bar.

DETAILED DESCRIPTION

Referring to FIGS. 1, 2 and 3 a disc brake assembly 10 is shown mounted on an axle 11. A wheel 12 having a flange 13 may be rotatably mounted on the axle 11 about an axis A of the axle. A brake disc 14 having a cylindrical disc adapter 15 may also be rotatable about the axis A of the axle 11. The disc adapter 15 may be fastened to the wheel flange 13 by studs 16 extending through the flange and into threaded engagement with threaded holes in the disc adapter at circumferentially spaced-apart positions around the flange.

The axle 11 has a radially extending flange 17 for supporting a torque plate 18 having an annular ring 19 fastened to the flange 13 of the axle 11 by bolts 22 and nuts 23 extending through the flange 17 and ring 19 at circumferentially spaced-apart positions around the ring and flange. The torque plate 18 has arms 24 and 25 extending radially outward from the ring 19 to circumferentially spaced-apart positions 26 and 27 and a floating caliper member 28 extending axially of the disc 14 is located in the space between the arms.

At the outboard end of the caliper member 28 a radially extending member such as rear legs 29 and 30 extend radially inward in overlapping relationship with the disc 14. At the inboard end of the caliper member 28 a radially extending member such as front leg 32 extends radially inward in overlapping relationship with the disc 14. Interposed between an outboard face 33 of the disc 14 and the rear legs 29 and 30 of the caliper member 28 is a friction lining carrier 34 carrying a friction lining 35 for engagement with the outboard face of the disc. Interposed between an inboard face 36 of the disc 14 and the front leg 32 is a friction lining carrier 37 carrying a friction lining 38 for engagement with the inboard face of the disc.

The front leg 32 of the caliper member 28 includes a housing 39 having a cylinder 42 in which a piston 43 is slidably mounted and extends into engagement with the lining carrier 37. The cylinder 42 may be in communication with a fluid pressure source such as a hydraulic pump (not shown). Fluid pressure in the cylinder 42 actuates the piston 43 urging it and the lining carrier 37 to the left as shown in FIG. 3 moving the friction lining 38 into braking engagement with the inboard face 36 of the disc 14. At the same time the force exerted on the front leg 32 is transmitted through a caliper beam 44 to the rear legs 29 and 30. The force from the rear legs 29 and 30 is transmitted to the lining carrier 34 urging the friction lining 35 into engagement with the outboard face 33 of the disc 14. This movement of the caliper member 28 is to the right as shown in FIG. 3 away from the wheel flange 13. Likewise as the friction linings 35 and 38 wear, the caliper member 28 will move away from the wheel flange 13.

Each of the arms 24 and 25 includes a supporting plate 45 and 46 respectively extending axially of the disc 14 at the inboard side. A supporting slider member 47 for supporting the caliper member 28 and the lining carriers 34 and 37 has parallel axially extending rails 48 and 49 fastened to the supporting plates 45 and 46 by studs 52 extending through the rails and into threaded engagement with holes in the supporting plates.

The rails 48 and 49 extend axially over the disc 14 to outboard ends 53 and 54 when they are connected to a tie bar 55. The tie bar 55 extends from the rails 48 and 49 radially inward of the rear legs 29 and 30 of the caliper member 28 between the disc adapter 15 and the rear legs. Radially extending end portions 56 and 57 extend from the rails 48 and 49 radially inward to a circumferentially extending center portion 58 of the tie bar 55. The center portion 58 is located radially inward of the rear legs 29 and 30 and radially outward of the disc adapter 15 and may have a curvature in a plane parallel to the plane of disc 14 with a radius R as shown in FIG. 1 about the axis A of the axle 11 so as to take a minimum of space between the rear legs 29 and 30 and the disc adapter 15. The tie bar 55 is also retracted in the end of the brake assembly 10 so that the outboard end of the caliper member 28 at the rear legs 29 and 30 may be as close as possible to the wheel flange 13 providing the maximum caliper penetration into the wheel envelope.

The caliper member 28 has slots 62 and 63 at each side extending through the front leg 32 and rear legs 29 and 30 for sliding engagement with the rails 48 and 49. Also the lining carriers 34 and 37 have grooves 64 and 65 at the sides for sliding engagement with the rails 48 and 49.

The rails 48 and 49 may have insets 66 and 67 to provide clearance for the disc 14 which extends outwardly to a position close to the radially inner surface 68 of the caliper beam 44. With this construction the radius RD of the disc 14 shown on FIG. 1 may be maximized.

To replace the lining carriers 34 and 37 having worn friction linings 35 and 38 with lining carriers having new friction linings the wheel 12 is removed by removing studs 16 and pulling off the wheel 12 and flange 13. Then by removing the studs 52 the rails 48 and 49 may be lifted off the supporting plates 45 and 46 along with the caliper member 28 and lining carriers 34 and 37. The caliper member 28 and lining carriers 34 and 37 may then be slipped off the inboard ends of the rails 48 and 49 after which substitute lining carriers 34 and 37 may be installed. The caliper member 28, slider member 47 and lining carriers 34 and 37 may be set down over the disc 14 and on the supporting plates 45 and 46 where the rails 48 and 49 may again be fastened to the supporting plates by studs 52.

With this construction the tie bar 55 connects the rails 48 and 49 for distributing torque forces from the lining carriers 34 and 37 between the arms 24 and 25 of the torque plate 18. By extending between the rear legs 29 and 30 and the disc adapter 15 the tie bar 55 does not require additional space beyond the outboard end of the caliper member 28 and maximum caliper penetration into the wheel envelope is obtained. Furthermore a maximum radius RD of the disc 14 is obtained for a given wheel envelope size. The tie bar 55 also provides a force damping effect for each of the rails 48 and 49.

The invention is capable of other modifications and adaptions by those having ordinary skill in the art and is more particularly defined by the appended claims.

We claim:

1. A disc brake assembly having a brake disc rotatable about an axis, a floating caliper member extending axially of said disc and having radially extending members overlapping opposite faces of said disc, friction lining carriers disposed on opposite sides of said disc, friction linings mounted on said friction lining carriers, actuating means for urging said lining carriers together and said friction linings into braking engagement with said opposite faces of said disc, and said friction lining carriers being interposed between said disc and said radially extending members of said caliper member wherein said brake assembly comprises a non-rotatable mounting member having arms extending radially outward to circumferentially spaced-apart positions relative to said disc providing a space between said arms for said caliper member, a supporting slider member having axially extending rails mounted on said arms, said caliper member being supported by said rails and in sliding engagement in the axial direction, said friction lining carriers being supported by and in torque transmitting sliding engagement with said rails in the axial direction, and a tie bar member connecting said axially extending rails, said tie bar member having a circumferentially extending center portion and radially extending end portions connected to said rails at the radially outer ends, said center portion of said tie bar member being located radially inward of one of said radially extending members of said caliper member overlapping one of said faces of said disc to minimize the axial length of said brake assembly and damp the forces exerted on said rails by said lining carriers.

2. A disc brake assembly according to claim 1 wherein said disc is mounted on a wheel having a radially extending wheel flange and said one of said axially extending members of said caliper member is located adjacent said wheel flange for disposition of said caliper member close to said wheel flange.

3. A disc brake assembly according to claim 2 wherein said disc is connected to said wheel flange by an axially extending adapter member located at a spaced-apart position radially inward of said one of said radially extending members of said caliper member and said circumferentially extending center portion of said tie bar member being positioned between said adapter member and said radially extending member of said caliper member.

4. A disc brake assembly according to claim 1 wherein said circumferentially extending center portion of said tie bar member has a curvature in a plane parallel to the plane of said disc.

5. A disc brake assembly according to claim 4 wherein said circumferentially extending center member has a radius of curvature about the same axis as said disc.

6. A disc brake assembly according to claim 1 wherein said rails are removably fastened to said arms of said non-rotatable mounting member.

7. A disc brake assembly according to claim 1 wherein said rails are in parallel relationship and each of said rails has an obstructed end for sliding said friction lining carriers and said caliper member on and off said rails in an axial direction.

8. A disc brake assembly according to claim 1 wherein said radially extending members of said caliper member include a pair of back legs at one side of said disc, a front leg at the other side of said disc and slots in said front leg and said back legs for sliding engagement with said rails.

9. A disc brake assembly according to claim 8 wherein one of said friction lining carriers is interposed between said back legs and said disc, the other of said friction lining carriers is interposed between said front leg and said disc and said friction lining carriers having grooves at circumferentially spaced edges for sliding engagement with said rails.

10. A disc brake assembly according to claim 8 wherein said front leg of said caliper member includes a housing and said actuating means comprises a piston cylinder assembly in said housing including a piston engageable with one of said friction lining carriers for actuating said assembly and urging said friction linings into braking engagement with said faces of said discs.

* * * * *